(12) United States Patent
Wechsler et al.

(10) Patent No.: US 10,787,093 B2
(45) Date of Patent: Sep. 29, 2020

(54) INDUCTIVE POWER TRANSFER WITH INDUCTIVE POWER TRANSFER PAD INCLUDING CLEANING DEVICE

(71) Applicant: Bombardier Primove GmbH, Berlin (DE)

(72) Inventors: Simon Wechsler, Mannheim (DE); Roman Gunt, Heidelberg (DE)

(73) Assignee: Bombardier Primove GmbH, Berlin (DE)

( * ) Notice: Subject to any disclaimer, the term of this patent is extended or adjusted under 35 U.S.C. 154(b) by 0 days.

(21) Appl. No.: 16/383,967

(22) Filed: Apr. 15, 2019

(65) Prior Publication Data
US 2019/0241084 A1    Aug. 8, 2019

Related U.S. Application Data

(62) Division of application No. 15/121,951, filed as application No. PCT/EP2015/054216 on Feb. 27, 2015, now Pat. No. 10,315,524.

(30) Foreign Application Priority Data

Feb. 28, 2014 (GB) .................................. 1403548.9

(51) Int. Cl.
*B60L 53/38* (2019.01)
*B60L 53/124* (2019.01)
(Continued)

(52) U.S. Cl.
CPC ............... *B60L 53/38* (2019.02); *B60L 53/12* (2019.02); *B60L 53/124* (2019.02);
(Continued)

(58) Field of Classification Search
CPC ............ B60L 53/124; B60L 53/10–18; B60L 53/30–39; H02J 50/60
See application file for complete search history.

(56) References Cited

U.S. PATENT DOCUMENTS 5,654,621 A    8/1997 Seelig
5,821,731 A    10/1998 Kuki et al.
(Continued)

FOREIGN PATENT DOCUMENTS

CN    102695629 A    9/2012
CN    102741083 A    10/2012
(Continued)

*Primary Examiner* — Rexford N Barnie
*Assistant Examiner* — David A Shiao
(74) *Attorney, Agent, or Firm* — The Webb Law Firm (57) ABSTRACT

An inductive power transfer pad for inductive power transfer to a vehicle, which includes a stationary part and a movable part, where the movable part includes a primary winding structure for generating a magnetic or electromagnetic field while an electric current flows through windings of the primary winding structure. The inductive power transfer pad includes at least one actuator for actuating motion of the movable part and the movable part is movable at least into a first direction by the at least one actuator so as to move between a retracted state and an extended state. The inductive power transfer pad includes a cleaning device integrated in the inductive power transfer pad and adapted to remove foreign matters from a space between the stationary part and the movable part.

12 Claims, 5 Drawing Sheets

(51) Int. Cl.
*H02J 50/10* (2016.01)
*H02J 50/90* (2016.01)
*B60L 53/302* (2019.01)
*H02J 50/00* (2016.01)
*B60L 53/12* (2019.01)
*H01F 38/14* (2006.01)

(52) U.S. Cl.
CPC .......... *B60L 53/302* (2019.02); *H02J 50/005* (2020.01); *H02J 50/10* (2016.02); *H02J 50/90* (2016.02); *B60L 2240/36* (2013.01); *B60Y 2200/91* (2013.01); *B60Y 2300/91* (2013.01); *H01F 38/14* (2013.01); *Y02T 10/7005* (2013.01); *Y02T 10/7055* (2013.01); *Y02T 10/7072* (2013.01); *Y02T 90/122* (2013.01); *Y02T 90/14* (2013.01)

(56) References Cited

U.S. PATENT DOCUMENTS

| | | | |
|---|---|---|---|
| 9,251,950 B2 | 2/2016 | Hatanaka et al. | |
| 2001/0003416 A1* | 6/2001 | Kajiura | B60L 53/31 320/109 |
| 2010/0235006 A1 | 9/2010 | Brown | |
| 2011/0181240 A1 | 7/2011 | Baarman et al. | |
| 2012/0119575 A1* | 5/2012 | Kurs | B60L 3/003 307/10.1 |
| 2012/0161696 A1 | 6/2012 | Cook et al. | |
| 2012/0203410 A1 | 8/2012 | Wechlin et al. | |
| 2013/0015699 A1 | 1/2013 | Mita | |
| 2013/0175987 A1 | 6/2013 | Amma et al. | |
| 2013/0207601 A1 | 8/2013 | Wu et al. | |
| 2013/0307477 A1 | 11/2013 | Reinschke | |
| 2014/0021913 A1 | 1/2014 | Martin et al. | |
| 2014/0055089 A1 | 2/2014 | Ichikawa et al. | |
| 2014/0097671 A1* | 4/2014 | Nakamura | H02J 50/12 307/9.1 |
| 2014/0111021 A1 | 4/2014 | Nakamura | |
| 2014/0239735 A1* | 8/2014 | Abe | H02J 50/10 307/104 |
| 2014/0285139 A1 | 9/2014 | Ahn et al. | |
| 2015/0084426 A1* | 3/2015 | Wechlin | H02J 50/10 307/104 |
| 2015/0123609 A1* | 5/2015 | Niizuma | E04H 6/34 320/108 |
| 2015/0200550 A1* | 7/2015 | Maekawa | B60L 53/36 307/104 |
| 2015/0327405 A1* | 11/2015 | Niizuma | H01F 27/16 307/104 |
| 2016/0167531 A1 | 6/2016 | Martin et al. | |
| 2016/0254707 A1* | 9/2016 | Fujiwara | B60L 53/124 307/104 |

FOREIGN PATENT DOCUMENTS

| | | |
|---|---|---|
| CN | 103443884 A | 12/2013 |
| CN | 103580093 A | 2/2014 |
| DE | 102007033654 A1 | 4/2008 |
| DE | 102011108543 A1 | 2/2012 |
| DE | 102010042395 A1 | 4/2012 |
| DE | 102013107517 A1 | 1/2014 |
| JP | 2010226945 A | 10/2010 |
| WO | 2011084936 A2 | 7/2011 |
| WO | 2012058466 A1 | 5/2012 |
| WO | 2014035399 A1 | 3/2014 |

* cited by examiner

INDUCTIVE POWER TRANSFER WITH INDUCTIVE POWER TRANSFER PAD INCLUDING CLEANING DEVICE

CROSS-REFERENCE TO RELATED APPLICATIONS

This application is a divisional application of U.S. patent application Ser. No. 15/121,951, filed Aug. 26, 2016, which is the United States national phase of International Application No. PCT/EP2015/054216, filed Feb. 27, 2015, and claims priority to United Kingdom Patent Application No. 1403548.9, filed Feb. 28, 2014, the disclosures of which are hereby incorporated in their entirety by reference.

BACKGROUND OF THE INVENTION

Field of the Invention

The invention relates to an inductive power transfer pad and a system for inductive power transfer, in particular to a vehicle. Furthermore, the invention relates to a method of operating an inductive power transfer pad.

Description of Related Art

Electric vehicles, in particular a track-bound vehicle, and/or a road automobile, can be operated by energy which is transferred by means of an inductive power transfer. Such a vehicle may comprise a circuit arrangement, which can be a traction system or a part of a traction system of the vehicle, comprising a receiving device adapted to receive a magnetic field or an electromagnetic field and to produce an electric current by magnetic induction. Furthermore, such a vehicle can comprise a rectifier adapted to convert an alternating current (AC) produced by the receiving device to a direct current (DC). The DC can be used to charge a traction battery or to operate an electric machine. In the latter case, the DC can be converted into an AC by means of an inverter.

The inductive power transfer is performed using two sets of winding structures. A first set (primary winding structure) is fixed, such as installed on the ground and can be fed by a wayside power converter (WPC). The second set of windings is installed on the vehicle. For example, the second set of windings (secondary winding structure) can be attached to the vehicle, e.g. underneath the vehicle, in the case of trams under some of its wagons. For an automobile it can be attached to the vehicle chassis. The second set of windings or, generally, the secondary side arrangement is often referred to as pick-up or receiver. The first set of windings and the second set of windings form a high frequency transformer to transfer electric energy to the vehicle by converting it into field energy on the primary side, transferring the field energy and converting it back into electric energy on the secondary side. This can be done in a static state (when there is no movement of the vehicle) and in a dynamic state (when the vehicle moves). Besides stationary primary side units movable units are also known which comprise a movable part comprising the primary winding structure.

U.S. Pat. No. 5,654,621 discloses an inductive transmitter having a primary element and a secondary element which is attached to the vehicle, wherein the primary element is power driven to move in all three spatial coordinates with a predetermined spatial area.

DE 10 2010 042395 A1 discloses a system for inductive charging of a battery of a vehicle, wherein a primary coil is automatically placeable.

DE 10 2007 033654 A1 discloses a base unit with a driving means to reduce a distance between a primary conductor and a secondary coil.

US 2010/0235006 A1 discloses a movable automated charging apparatus comprising a base, a scissor lift, a pedestal, a joint and a charger. The charger is configured to mate with a vehicle receptacle physically or via proximity.

SUMMARY OF THE INVENTION

The inductive power transfer pad according to the present invention comprises a stationary part and a movable part. The movable part comprises a primary winding structure for generating a magnetic or electromagnetic field while an electric current flows through windings of the structure. At least one actuator actuates motion of the movable part, wherein the movable part is movable at least into a first direction by the at least one actuator so as to move between a retracted state and an extended state. The invention is not limited to pads having an extended state in which the movable part has always the same position. Rather, as for example mentioned above in connection with U.S. Pat. No. 5,654,621, the movable part may be moved in all three spatial directions. As a result, the extended state may include a multiplicity of positions of the movable part relative to the stationary part. On the other hand, it is preferred that the movable part is always in the same position and orientation with respect to the stationary part, when the movable part is in the retracted state.

Typically, the stationary part comprises operating devices, which are electric and/or electronic devices adapted to operate the primary winding structure so that the primary winding structure generates the magnetic or electromagnetic field. The operating devices are electrically connected to the primary winding structure and produce heat during operation. Examples of the operating devices are semiconductor switches, such as IGBTs, of a converter for converting a direct current into an alternating current which flow through the primary winding structure during operation. Alternatively, the converter may convert an alternating current having a first, smaller frequency into an alternating current having a second, higher frequency. Another example of the operating devices are capacitors for compensating an inductance or inductances of the primary winding structure. In particular, the reactance of the arrangement shall be reduced by the capacitor(s).

During operation of the primary winding structure, the heat produced by the operating devices is to be transported away from the operating devices. Otherwise, they may malfunction or may be damaged. In addition, the operating temperature of the operating devices may be limited by a maximum value for smooth operation.

Furthermore, rough operating conditions of the inductive power transfer pad are to be taken into account. Dirt and liquids may drop from a vehicle which is to be provided with energy by the inductive power transfer pad. Therefore, such foreign matters may cover the surface of the pad and may deteriorate the heat transport to the environment.

It is an object of a first aspect of the invention to provide an inductive power transfer pad having a stationary part and a movable part comprising a primary winding structure, wherein the heat transport from the operating devices to the environment shall be maintained despite outer influences, such as foreign matters. R is a further object of the first aspect of the invention to provide a corresponding system comprising the inductive power transfer pad and other system components, such as a control device for controlling the operation of the inductive power transfer pad and/or a secondary side receiving device (pickup) which may be attached to a vehicle. Still a further object of the first aspect of the invention is to provide a corresponding method of operating an inductive power transfer pad.

According to a basic idea of the first aspect of the invention, the stationary part of the pad comprises a cooling device which is thermally coupled to the operating devices and which is adapted to transfer heat to an environment of the inductive power transfer pad. Such a cooling device improves the heat transport to the environment.

In order to protect the cooling device from outer influences while the movable part is in the retracted state, the cooling device is covered by the movable part in the retracted state and the movable part uncovers the cooling device while being moved into the extended state. Therefore, the cooling device is not only protected in the retracted state, but heat transfer to the environment is improved in the extended state.

Therefore, the following is provided: An inductive power transfer pad, in particular a transfer pad of a system for inductive power transfer to a vehicle, comprising a stationary part and a movable part, wherein the movable part comprises a primary winding structure for generating a magnetic or electromagnetic field while an electric current flows through windings of the structure, wherein the inductive power transfer pad comprises at least one actuator for actuating motion of the movable part, wherein the movable part is movable at least into a first direction by the at least one actuator so as to move between a retracted state and an extended state, wherein the stationary part comprises operating devices, which are electric and/or electronic devices adapted to operate the primary winding structure so that the primary winding structure generates the magnetic or electromagnetic field, wherein the operating devices are electrically connected to the primary winding structure and produce heat during operation, the stationary part comprises a cooling device which is thermally coupled to the operating devices and is adapted to transfer heat to an environment of the inductive power transfer pad, the cooling device is covered by the movable part in the retracted state and the movable part uncovers the cooling device while being moved into the extended state.

In addition, a corresponding method is proposed of operating an inductive power transfer pad, in particular a transfer pad of a system for inductive power transfer to a vehicle, comprising a stationary part and a movable part, wherein the movable part comprises a primary winding structure which is operated to generate a magnetic or electromagnetic field by conducting an electric current through windings of the structure, wherein an actuator of the inductive power transfer pad actuates motion of the movable part, so that the movable part is moved at least into a first direction and so that the movable part is moved between a retracted state and an extended state, wherein operating devices of the stationary part, which are electrically connected to the primary winding structure, operate the primary winding structure so that the primary winding structure generates the magnetic or electromagnetic field and produce heat during operation, a cooling device of the stationary part, which is thermally coupled to the operating devices, is used to transfer heat to an environment of the inductive power transfer pad, the cooling device is covered by the movable part in the retracted state and the movable part uncovers the cooling device while being moved into the extended state.

A preferred embodiment of the cooling devices comprises a heat sink. In particular, the heat sink may comprise ribs and/or fins. More generally speaking, the heat sink may be formed so as to have an increased surface compared to a device of the same volume and in particular of the same basic form (such as cuboid). In particular, the heat sink has a plurality of projections projecting from its surface.

By using a heat sink, the heat is efficiently transferred from the heat sink to the air. In case of the projections (e.g. ribs and/or fins), the heat is transferred from the heat sink to the environment via a correspondingly shaped surface.

The cooling device may comprise more than one heat sink. In this case, it is preferred that each heat sink is covered by the movable part in the retracted state and is uncovered if the movable part moves into the extended state.

The movable part may comprise separate elements, which are not necessarily moved in the same manner. For example, the element comprising the primary winding structure may be lifted in the first direction while an additional cover element which covers the cooling device moves in a different direction and/or is tilted away from the cooling device. Preferably, the motion of different elements of the movable part is kinematically coupled. For example, the same actuator or the same arrangement of coupled actuators may be used to actuate the coupled motion.

According to a preferred embodiment, at least one of the operating devices is located in a housing, wherein an outer shell of the housing is made of a first material. The cooling device is located outside of the housing. During operation of the operating devices, heat is conducted from at least one of the operating devices to the cooling device via a heat conducting material extending through the outer shell of the housing, wherein the heat conducting material has a higher heat conductivity than the first material. For example, the first material is a plastic material and is preferably electrically insulating. The heat conducting material may be a metal, such as aluminum or copper, having a high heat conductivity or may be another material of high heat conductivity. The outer shell including the heat duct realized by the heat conducting material that extends through the outer shell preferably forms a liquid-tight housing of the housed operating device(s).

In particular, the cooling device may be placed sideways of the operating device in a direction transverse to the first direction into which the movable part can be moved into the extended state. In particular, the cooling device may be placed in a recess of the stationary part and the movable part may partially fill the recess in the retracted state. The cooling device or a part of the cooling device may be placed in a remaining part of the recess. Preferably, a base plate, sideways of the recess and the movable part may completely cover the inner volume of the recess in the retracted state. This is also the preferred embodiment it there is no cooling device or if there is no cooling device within the recess.

Since the cooling device is placed sideways of the operating device and since the movable part is movable into the first direction transverse to the direction connecting the operating device and the cooling device, an overlap or projection (in particular of a lid) of the movable device may cover the cooling device in the retracted state. It is not necessary that the covering section of the movable part contacts the cooling device in the retracted state, although this is possible. The overlap or projection may or may not comprise a section or sections of the windings of the primary winding structure. In the preferred embodiment, a housing (in particular the lid) of the movable part includes the complete primary winding structure except the supply lines.

In particular, the first direction is the vertical direction and a vehicle may be positioned above the inductive power transfer pad while being provided with energy by the pad. It preferred that the movable part covers the cooling device at least in the first direction.

According to a second aspect of the invention, which can be combined with any other aspect of the invention or can be realized separately, the inductive power transfer pad comprises a cleaning device integrated in the inductive power transfer pad and adapted to remove foreign matters (such as dirt, particles or liquid substances or combinations thereof) from a space between the stationary part and the movable part. According to a corresponding method of operating the IPT pad, the cleaning device removes the foreign matters from the space.

In particular, the space is enclosed or at least partially enclosed by the combination of the movable part and the stationary part, when the movable part is in the retracted state. In contrast, the space is not enclosed or enclosed to a lesser extent, if the movable part is in the extended state. This means that the space becomes exposed to possibly entering foreign matters, if the movable part is moved from the retracted state to the extended state.

Due to the integrated cleaning device, the foreign matters are removed (or at least partially removed) from the space. Therefore, the IPT pad, a corresponding IPT system comprising the IPT pad and a corresponding operating method solve the underlying problem that foreign matter may intrude into the space while exposed to the environment.

Preferably, the cleaning device is automatically operated to remove the foreign matters from the space while the movable part moves from the extended state into the retracted state. This has the advantage that the space is cleaned immediately before it is again protected to a higher extent when the movable part reaches the retracted state.

According to a specific embodiment, the cleaning device comprises bellows (which may be the protective bellows described below) having an expandable air volume with at least one air outlet adapted to direct an air blast to at least a part of the space between the stationary part and the movable part. The expandable air volume is inflated while the movable part moves from the retracted state into the extended state and is deflated while the movable part moves from the extended state into the retracted state.

This is one embodiment which uses the motion of the movable part from the extended state into the retracted state to clean the space. Another option which can be realized in addition or alternatively, is that the cleaning devices comprises a cleaning element (such as a brush) attached to the movable part or to the actuator and arranged to wipe off the foreign matters from a surface of the stationary part and/or from the actuator. According to corresponding methods of operating the IPT pad the cleaning device blasts off and/or wipes off the foreign matters. Similarly to the embodiment using the air blast, the embodiment which includes wiping off the foreign matters (i.e. removes the foreign matters mechanically) is not restricted to using the motion of the movable part from the extended state into the retracted state, although using this motion is the preferred embodiment. In any case, using this motion has the advantage that no additional actuator is required for performing the cleaning.

According to an embodiment of the bellows, the expandable air volume occupies an area between the movable part and the stationary part. Further details are described below with respect to the protective bellows. In case of the protective bellows, at least a part of the actuator is located in the expandable air volume. Therefore, this part of the actuator can be cooled by the air entering the air volume while the movable part is moved from the retracted state into the extended state. At least some of the heated air is blown out of (removed from) the air volume later, when the movable part moves back into the retracted state.

According to a preferred embodiment, the expandable air volume has an air inlet which is positioned closer to the movable part than to the stationary part. In particular, the air inlet may be located close to the underside of the movable part (e.g. the housing which comprises the primary winding structure) where it is likely that the air is not contaminated. In particular, the air volume delimited by the bellows may be covered by the housing of the movable part, wherein the housing projects from the air volume sideways in a direction transverse to the first direction. In this manner, the area where the air inlet is located is additionally protected by the projection from contaminations in form of foreign matters.

In addition or alternatively, at least one air outlet of the expandable air volume is located closer to the stationary part than to the movable part. Preferably, the at least one air outlet is positioned near by the space which is to be cleaned from foreign matters. However, it is also possible that an air duct is connected to the air outlet and guides and optionally redirects air from the air outlet to the space which is to be cleaned.

A preferred object which is to be cleaned and is therefore located in the space between the stationary part and the movable part is the cooling device of the first aspect of the invention. In particular, space portions in between ribs or fins of the cooling device may be contaminated with foreign matters and this will deteriorate the heat transfer from the cooling device to the surrounding air. Blowing air onto the cooling device cleans the cooling device from the foreign matters and, in addition, increases the heat transfer from the cooling device to the surrounding air. Preferably, the air blast is directed in such a manner that air flows in the longitudinal direction of spaces in between ribs or fins of the cooling device.

Optionally, the air inlet and/or the air outlet of the expandable air volume can be provided with a one-way valve, such as a flap or combination of flaps.

The bellows may be made of thin sheet-like, in particular flexible plastic.

A third aspect of the invention, which can be combined with any other aspect of the invention or can be realized separately, is based on the underlying problem that the function of the IPT pad may be obstructed by ice and snow. In particular, the movable part or any element of the actuator may freeze to the stationary part. Therefore, it is proposed that the IPT pad comprises a heating for heating the IPT pad. In particular, before the movable part is moved from the retracted state into the extended state, the heating is operated. This will melt any ice which obstructs the motion of the movable part.

In particular, the heating is an additional heating other than operating devices which are used to operate the primary winding structure in order to generate the magnetic or electromagnetic field. In particular, an additional electric heating (such as a heating comprising at least one heating wire) is provided.

Preferably, the heating is located at a gap or at a boundary surface of the stationary part on one side and the movable part on the other side, when the movable part is in the retracted state. When moving the movable part into the extended state, the gap will be increased or the movable part will lose contact to the stationary part at the boundary surface, respectively. In any case, ice in the gap or at the boundary surface can be removed (in particular melted).

In particular, the IPT pad is adapted to operate the heating while the movable part is in the retracted state and the primary winding structure is not operated. Operating the heating in particular prepares operating the actuator in order to bring the movable part in the extended state where the primary winding structure is to be operated. On the other hand, it is also possible in some situations to operate the primary winding structure in the retracted state. In this case, it might not be necessary to operate the additional heating, since motion of the movable part is not required and since the primary winding structure may produce heat during operation which may also melt ice.

Preferably, the heating is only operated if the temperature of the pad or in the environment is below a threshold value, such as 0° C.

According to another aspect which may be a sub-aspect of the third aspect of the invention, the underlying problem shall be solved that in particular the stationary part and the actuator (in particular the movable elements of the actuator) shall be protected from liquids, such as water.

In particular in the case that the stationary part defines a volume which is occupied by the movable part in the retracted state, and that the stationary part comprises a delimitation (such as the base plate) limiting the volume at its bottom, the delimitation may be provided with at least one opening (in particular a through-hole) adapted to drain liquids from the volume to an environment of the inductive power transfer pad. Therefore, liquids and in particular melted ice can be drained from the volume through the at least one opening in the delimitation to the environment.

The term "pad" is used in this description for a device that comprises the stationary part and the movable part. For this reason, "pad" is not limited to a monolithic block. Rather, "pad" is a common expression in the technical field of IPT systems for the unit which comprises the primary winding structure and optionally operating device for operating the primary winding structure.

As mentioned above, an inductive power transfer pad, in particular a transfer pad of a system for inductive power transfer to a vehicle, is proposed. The inductive power transfer pad (IPT pad) may be part of a primary side unit or arrangement of a system for inductive power transfer.

Furthermore, the power transfer pad comprises at least one actuator, wherein the movable part is movable at least into a first (in particular the vertical) direction by the at least one actuator. In the context of this invention, the term "actuator" can denote the entity of all components or elements by which the motion of the movable part is effected.

The term "actuator" can thus comprise at least one force generating actuating device and at least one coupling device for mechanically coupling the actuating device and the movable part and/or at least one guide for guiding the movement of the movable part. The coupling device may be designed to transform motion generated by the actuating device into motion of the movable part.

The movable part is movable between a retracted state and an extended state.

In the retracted state, the movable part, in particular a lower surface of the movable part, may have no distance or a minimum possible distance in the first direction of the stationary part, in particular of a mounting portion of the stationary part of the IPT pad. Correspondingly, in the extended state, the distance of the movable part of the mounting portion can be a larger distance and in particular the maximum possible distance which can be achieved by the actuator. The mounting portion (in particular a base plate) can be used to mount the IPT pad to a supporting structure, in particular a surface of a route. The retracted state and the extended state with the maximum possible distance can optionally be defined by mechanical elements, e.g. stop elements and/or by the design of the actuator.

The first direction can be oriented parallel to a main propagation direction of the electromagnetic field generated by the primary winding structure during operation. In particular, the first direction can be oriented perpendicularly to a surface of the mounting portion (in particular the base plate) of the IPT pad or a surface to which the IPT pad is connected, such as the ground.

In the retracted state, the upper surface of the movable part can be located within the same plane as an upper surface of a portion (e.g. a housing of the operating devices) of the stationary part.

The movable part may comprise a housing in which the primary winding structure is arranged. Further, the movable part can comprise at least one connecting terminal for a power connection of the primary winding structure and the operating devices, e.g. an inverter, which can be arranged in the stationary part.

The movable part may comprise at least one object detection device, preferably housed by the same housing as the primary winding structure. In particular, the object detection device can detect a foreign object, in particular a metal object, and/or a vehicle within a charging volume of the IPT pad. In particular, the object detection device can detect or monitor a moving object, such as the vehicle to be charged.

At least one object detection device may comprise at least one inductive sensing system, wherein the inductive sensing system may comprise one or multiple detection winding(s). Multiple detection windings can be arranged in an array structure wherein the array structure covers a charging surface of the power transfer pad. Therefore, an active (including field generation) or passive detection can be performed. In the case of an active detection, one or more excitation winding(s) can be used. An active object detection can be performed by monitoring properties of an excitation field generated by the excitation winding(s). In the case of a passive detection, only one or more passive winding(s) are used. A passive object detection can be performed by monitoring properties of the passive winding(s), in particular an inductance. At least one object detection device (in the stationary part or the movable part) may comprise an RFID (radio frequency identification) unit. Using the RFID unit, a vehicle and, if applicable, a position of a vehicle with respect to the power transfer pad can be detected.

Alternatively or in addition, the object detection device may perform an image-based object detection, which may comprise an image capturing device, such as a camera.

More generally speaking, the stationary part and/or the movable part, may comprise a vehicle detection system. The vehicle detection system may comprise at least one sensor and an evaluation unit for evaluating output signals of the at least one sensor. The vehicle detection system can detect the presence of a vehicle in the surrounding of the IPT pad. For example, the vehicle detection system comprises an inductive sensor (e.g. a coil) and/or a capacitive sensor for detecting a vehicle.

The stationary part may comprise a DC connecting terminal and/or an AC connecting terminal and may comprise optionally at least one current converter (e.g. AC/AC or DC/AC) comprising an input side which is electrically coupled to the connecting terminal and an output side electrically coupled to the primary winding structure.

As mentioned before, the stationary part can comprise a housing. The converter can be arranged within the housing. In particular, the converter may be arranged within an inner volume of the housing of the stationary part. The housing of the stationary part may be a part of a larger housing of the IPT pad.

For example, the IPT pad can be installed in a vehicle hall or car port of a private property or in a public parking area for automobiles, wherein the IPT pad can be connected via the connecting terminal to a household electric network (generally an AC network) or a battery pack providing DC battery voltage with an arbitrary output voltage level. Generally speaking, the IPT pad can be installed on the ground such that a vehicle can be positioned above the IPT pad.

In particular, the IPT pad may be designed such that a power in the range of 3 kW to 20 kW can be transferred to e.g. a vehicle comprising a corresponding receiving device which can be also referred to as a pick-up. An amplitude of an input voltage at the connecting terminal may be 230V and an input current may be in the range of 16 A. This allows for transferring power in the range of 3 kW to 7 kW to a pick-up on a secondary side of an IPT system. Alternatively, the amplitude of the input voltage may be 460V (or any other voltage) and the input current may be in the range of 32 A, for example. This allows transferring power of approximately 20 kW to a pick-up.

Optionally, the stationary part comprises a control unit for controlling an operation of the converter. The control unit may be arranged within the housing of the stationary part.

In particular, the power transfer pad, e.g. the stationary part and/or the movable part, may comprise at least one guiding arrangement for guiding a magnetic flux (i.e. a magnetic field shaping arrangement) of the magnetic or electromagnetic field which is generated by the primary winding structure. In particular, the power transfer pad can comprise a ferrite arrangement, wherein the ferrite arrangement can e.g. comprise one or more ferrite bars or slab.

Preferably, the stationary part and/or the movable part, comprise(s) a compensating unit for compensating an inductance of a primary winding structure. The compensating unit can e.g. comprise one or more compensating capacitors which may be electrically connected in series to phase lines of the primary winding structure.

Furthermore, the IPT pad or a device connected to the IPT pad (such as a wall-mounted device) may comprise a human-machine-interface (HMI) and/or a signal transmitting and receiving device. The HMI allows for providing an input to e.g. the control unit which controls the operation of the inverter. The HMI may comprise a monitor and/or a display which displays information on a status of the IPT pad, e.g. if a charging process in progress, to a user. In addition, the IPT pad may comprise an input device, such as a touch-sensitive display and/or a keyboard. The signal transmitting and receiving means may be designed to transmit a signal and/or data between a vehicle and the IPT pad.

The primary winding structure may have any configuration which can generate a magnetic or electromagnetic field. In particular, windings of the primary winding structure may form at least one coil and/or may have a meandering course. The primary winding structure may be a one-phase or multi-phase structure.

Preferably, the stationary part and/or the movable part comprise(s) a shielding element, such as a metal shield. The shielding element shields an external area of the IPT pad from a field generated by the primary winding structure. For example, a base plate of the stationary part and/or of the movable part may comprise a metal plate extending in the two directions perpendicular to the first direction.

According to a specific embodiment, the coupling device comprises a scissor gear, in particular a scissor lift in case of the first direction being the vertical direction. The movable part can be mechanically connected to one side of the scissor gear and the stationary part (in particular a base plate) to the opposite side. Thereby, the scissor gear moves the movable part in the first direction.

More generally speaking, the actuator may comprise a lever mechanism for moving the movable part in the first direction if operated by the actuating device. Alternatively or in addition, the actuating device may comprise a piston-/cylinder unit (hydraulic or pneumatic), a linear motor and/or an electromotor coupled to a worm-drive.

Optionally, the movable part can be movable in at least one lateral direction in addition to the first direction. The lateral direction is transverse (in particular perpendicular) to the first direction. The first and the lateral direction may define a plane which is parallel to an upper surface of the movable part. In particular, the movable part may be movable so that a component of the motion extends in the first direction and, at the same time, a component of the motion extends in the lateral direction.

In particular, the IPT pad may comprise protective bellows for protecting at least a part of the actuator. In particular, at least a part and preferably all elements of the actuator can be arranged in an inner volume of the protective bellows. Therefore, foreign matter is blocked from entering the inner volume and any person nearby the pad is protected to be hurt by interfering with the actuator. The movable part, in particular a housing of the primary winding structure, may form a cover of the protective bellows and in this case may delimit its inner volume. The stationary part, in particular a base plate, may form a cover of the protective bellows and delimits in this case its inner volume at the side opposite to the cover formed by the movable part. The bellows may extend around and delimit the inner volume along the four lateral sides of the inner volume.

Alternatively or in addition, the movable part is rotatable. In particular, the movable part can be rotated about an axis in the first direction and/or in the lateral direction which extends perpendicularly to the first direction. Therefore, the orientation of the primary winding structure relative to the secondary winding structure can be adjusted and power transfer can be enhanced.

The invention also relates to an inductive power transfer system (IPT system), in particular for an inductive energy transfer to a vehicle. The IPT system comprises the IPT pad according to one of the embodiments described in this description. Furthermore, the IPT system comprises at least one receiving device (pick-up) for receiving a magnetic or an electromagnetic field generated by the primary winding structure of the IPT pad. Furthermore, the invention comprises a method of operating the system.

BRIEF DESCRIPTION OF THE DRAWINGS

Examples of the invention will be described with reference to the attached figures which show.

DETAILED DESCRIPTION OF THE INVENTION

Figure 1:
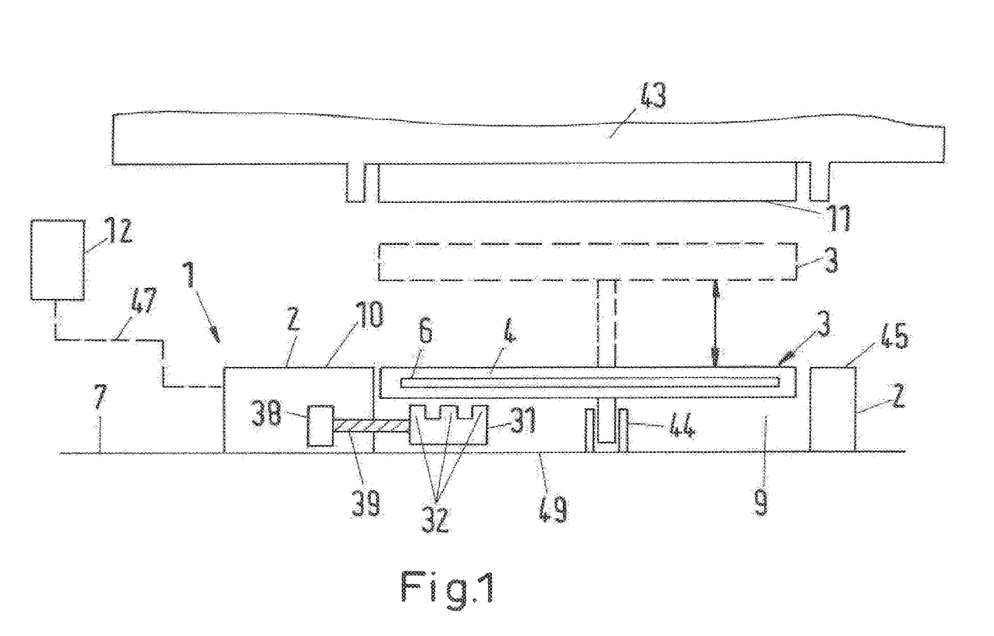
FIG. 1 a schematic side view of an inductive power transfer system.

FIG. 1 shows a schematic side view of an inductive power transfer system comprising an inductive power transfer pad 1 (IPT pad 1) having a stationary part 2 and a movable part 3. Solid lines indicate the movable part 3 in a retracted state and dashed lines show the movable part 3 in an extended state closer to a receiving device 11 mounted to the underside of a vehicle 43. The power transfer pad 1 rests on ground surface 7 which may be a driving surface for the vehicle 43. In the embodiment shown, the movable part 3 consists of a plate member 4 to which an actuator 44 is attached for lifting and lowering the movable part 3 in the vertical direction.

Within the plate member 4, a primary winding structure 6 is arranged. Optionally, at least a part of a foreign object and/or vehicle detection system (not shown) can be arranged within the plate member 4.

The stationary part 2 comprises a housing 10 which forms a circumferential edge together with other peripheral elements 45 of the stationary part 2. For illustration purposes, the peripheral element in the foreground of FIG. 1 is broken away. By the circumferential edge a recess 9 is defined, wherein the movable part 3 is at least partly located within the recess 9 in the retracted state. The actuator 44 is also located within the recess 9 in a space between the movable part 3 and the base plate 49 of the stationary part 2.

FIG. 1 also shows an operating device 38 for operating the primary winding structure 6, thereby generating the magnetic or electromagnetic field. The operating device 38 is thermally coupled with a cooling device 31 in the recess 9 via a heat conducting material 39 which extends from the operating device 38 through the outer shell of the housing 10 to the cooling device 31. This improves heat transfer from the operating device 38 to the environment via the cooling device 31 in the extended state of the movable part 3. The cooling device 31 has a heat sink comprising ribs 32 in order to increase the surface and therefore the heat transfer to the environment.

A control device 12, which may be mounted to a wall (not shown), is connected to electric and/or electronic devices within the housing 10 via a cable 47.

Figure 2:
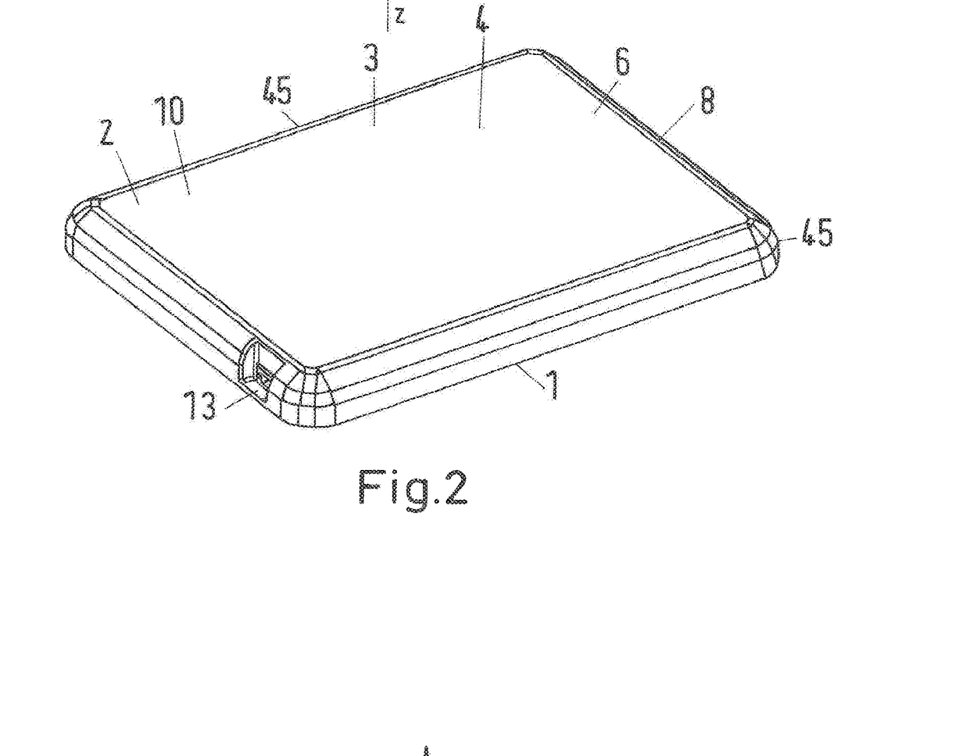
FIG. 2 a perspective view on an inductive power transfer pad in a retracted state, FIG. 3 a perspective view on the inductive power transfer pad shown in FIG. 2 in an extended state, FIG. 4 a perspective view on another inductive power transfer pad in an extended state, FIG. 5 another perspective view on the inductive power transfer pad shown in FIG. 4, FIG. 6 a perspective view on jet another inductive power transfer pad and FIG. 7 a perspective view on a jack-like lifting device.

FIG. 2 shows a perspective view of an inductive power transfer pad, such as the IPT pad 1 of FIG. 1, with a plate member 4 of the movable part 3 in the retracted state while it is received by the recess 9. The stationary part 2 has a housing 10 for housing elements such as the operating device 38 shown in FIG. 1. The other peripheral elements 45, which define the recess 9 together with the housing 10, are completely shown in the figure. An upper surface of the housing 10 of the stationary part 2 is arranged within the same plane as the upper surface 6 of the plate member 4 of the movable part 3.

A connecting terminal 13 for a connecting cable (such as the cable 47 of FIG. 1) is located on the side of the housing 10. In this manner, the electric and/or electronic components (such as components of a DC/AC inverter) within the housing 10 can be connected to external elements or units of the system, such as the control device 12 shown in FIG. 1. The housing 10 may also comprise a controller (not shown) for controlling the actuator (such as the actuator 44 schematically shown in FIG. 1) which actuates motion of the movable part 3. In addition, compensating elements (not shown) for compensating an inductance of a primary winding structure (not shown) can be arranged within the housing 10.

In this manner, the housing 10 protects the elements (such as the operating devices) arranged within the housing 10 of the stationary part 2 even if the movable part 3 is moved out of the recess 9 into the extended state.

Figure 3:
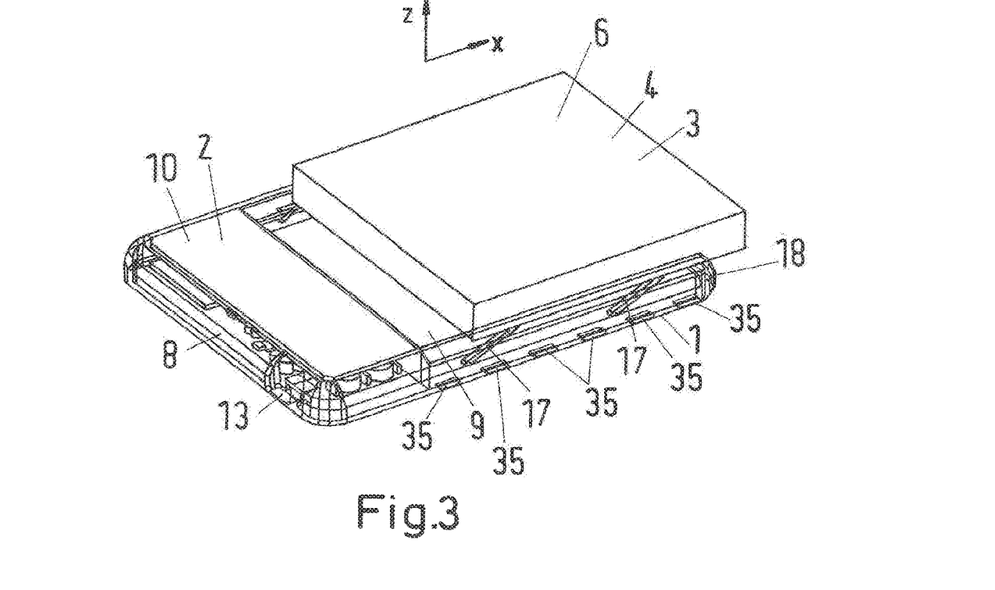

FIG. 3 shows a perspective view of the IPT 1 shown in FIG. 2. An actuating device of the actuator for actuating motion of the movable part 3 can be arranged within the recess 9. The plate member 4 comprises can another recess on its bottom side, wherein this recess is designed and arranged such that the actuating device is received by the recess in the retracted state of the movable part 3. Further coupling means of the actuator arrangement couple the actuating device to the movable part 3, namely to a lifting mechanism of the movable part 3. In the example shown in FIG. 3, the lifting mechanism comprises four motion guides 17 (e.g. guide rails), wherein the motion guides 17 may be formed by the sidewalls 18 of the recess 9. The motion guides are inclined and extend upwards. At least one element (not shown, for example a bearing element) of the movable part 3 may engage (e.g. project into) each of the motion guides, so that motion of the bearing elements and thereby the movable part 3 is guided while the lifting mechanism is operated. If the actuating device exerts a force in a horizontal direction x onto the movable part 3, it moves along the motion guide upwards and is thereby lifted. The lifting motion may be limited by a stop element, such as the end of the motion guides (e.g. guide rails). There are through-holes 35 in the bottom section of the sidewall 18 which enable liquids from the interior to be drained to the environment.

Figure 4:
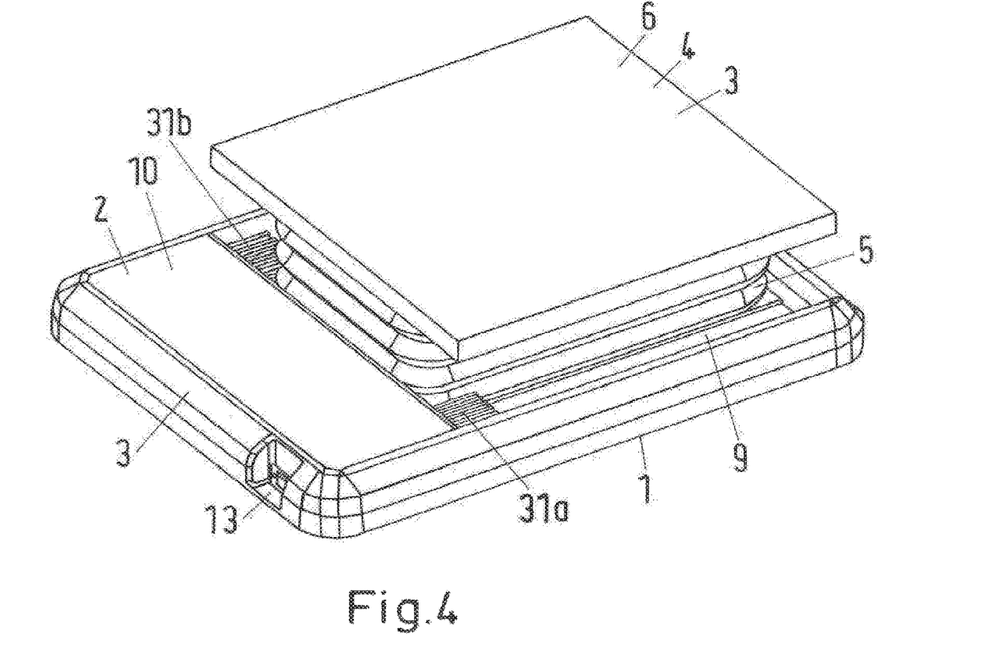

FIG. 4 shows a perspective view of another embodiment of an IPT pad. The same reference numerals are used for the same or functionally same parts and elements as in the other figures. Again, a movable part 3 comprises a plate member 4 with an upper surface 6. The movable part is connected to a lifting mechanism designed as a scissor lift 19 (see also the enlarged view of FIG. 5 with some parts being broken away, namely the left section of the bellows 5, the left sidewall and the upper half of the front sidewall). The lifting mechanism is arranged within protective bellows 5. In FIG. 4, an extended state of the movable part 3 is shown.

Figure 5:
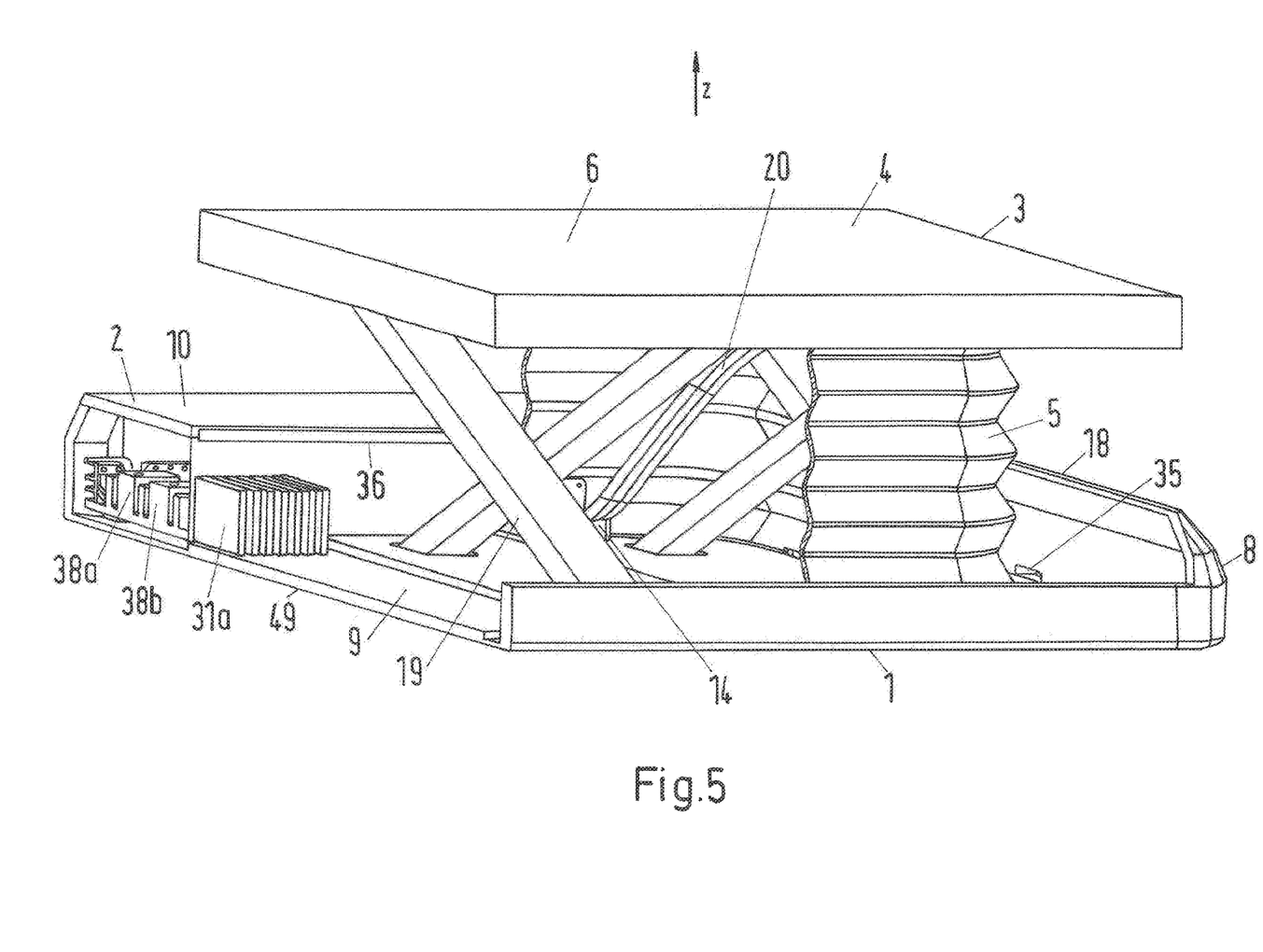

In FIGS. 4 and 5, cooling devices 31a, 31b in the form of ribbed heat sinks are shown next to (and preferably in contact with) the housing 10. As shown in FIG. 5, operating devices 38a, 38b can be located within the housing 10. Preferably, they at least one of the operating devices 38b is connected to the neighbouring cooling device 31a via a heat conducting material as schematically shown in FIG. 1.

FIG. 5 shows another perspective view of the power transfer pad 1 shown in FIG. 4. In particular, a scissor lift 19 is visible which provides a part of the lifting mechanism. The scissor lift 19 is actuated by an actuating device 14 which is arranged within the recess 9 of the IPT pad 1. A power cable 20 connects the primary winding structure (not shown) integrated in the plate member 4 with the operating devices 38, in particular with the AC side of an inverter. By means of the scissor lift 19, the movable part 3 can be lifted and lowered in the vertical direction z.

At the bottom of the sidewall 18 on the right hand side of FIG. 5, there is one of several possible drain holes 35 for draining liquids from the bottom of the recess 9 to the outside of the pad.

Generally speaking, drain holes in the stationary part of an IPT pad enable the user or engineer to clean the pad with water or other liquids. Preferably, all liquid-sensitive components are encapsulated, such as by the housing of the movable part or of the stationary part.

As schematically shown at the edge of the housing 10, the IPT pad 1 comprises a heating 36 for heating the IPT pad 1. The heating extends along a surface of the housing which delimits a gap to the plate member 4 of the movable part (in the retracted state). The same or an additional heating may extend along a gap between the sidewalls 18 of the stationary part and the plate member 4. Alternatively, the primary winding structure 6 may be used as a heating for melting ice in between the stationary part and the movable part.

Figure 6:
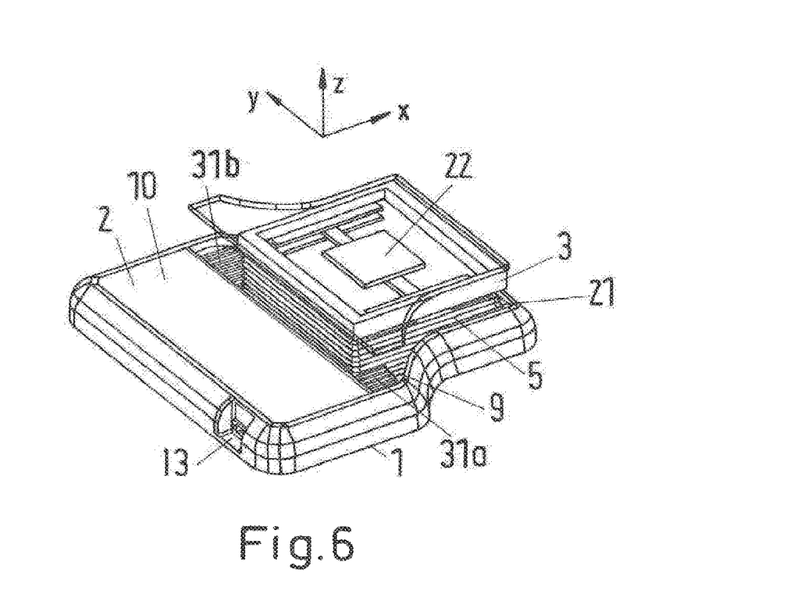

FIG. 6 shows a perspective view of another embodiment of an IPT pad. A plate member (similar to the plate member shown in FIGS. 1 to 5) which comprises the primary winding structure is removed for illustration purposes. In FIG. 6, the movable part 3 comprises an air lift 21, wherein a translation stage 22 is arranged on an upper end of the air lift 21. The translation stage 22 is designed and arranged such that a translational movement can be performed in a lateral directions x, y, wherein a plane spanned by the lateral direction x and the lateral direction y is parallel to an upper surface 6 of the plate member 4. The plate member 4 is mechanically connected to the translational stage 22. The air lift 21 comprises protective bellows 5 in the same manner as in FIG. 4.

Instead of an air lift 21, a scissor lift 19 (see FIG. 5) can be used in order to move the movable part 3 in the vertical direction z.

The IPT pad shown in any of the figures may further comprise a safety mechanism for avoiding uncontrolled motion, in particular unwanted lowering, of the movable part 3. The safety mechanism can e.g. comprise a spring element and/or a damping element which is arranged between the movable part 3, in particular the plate member 4, and the stationary part 2, in particular the base plate 49. For example, if the power supply of the actuator fails, the movable part can be lowered in a controlled manner.

Optionally, the IPT pad comprises a force sensor for sensing a force acting on the movable part 3, in particular on the plate member 4. In particular, if the sensed force exceeds a predetermined threshold value, the movement of the movable part 3 can be stopped. This reduces the likelihood of objects or limbs being pinched above or below the movable part 3 during lifting or lowering. In addition to or alternative to a force sensor, other object detection means can be used in order to detect objects within the motion range of the movable part 3.

Figure 7:
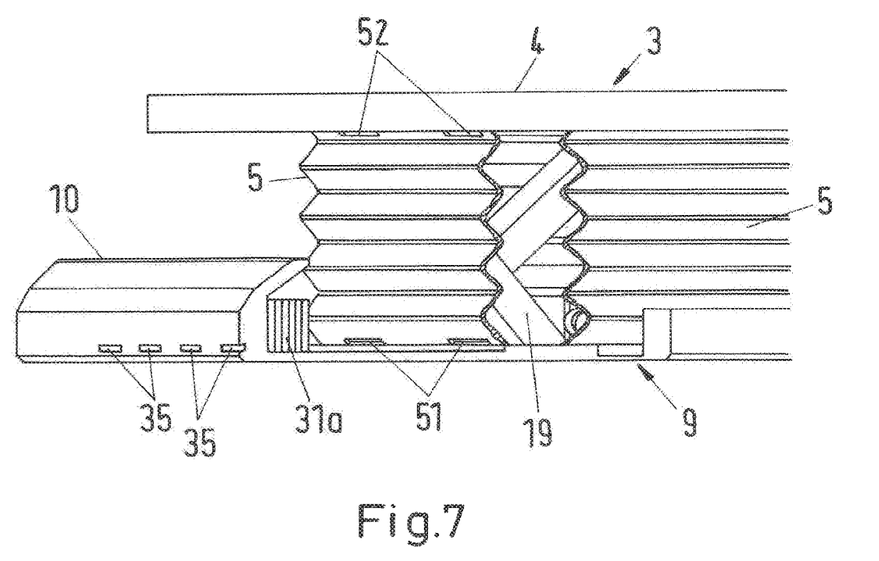

FIG. 7 shows a partial perspective view of the embodiment shown in FIG. 5. However, a part of the sidewall which is completely broken away in FIG. 5 is shown in FIG. 7, namely the part of which belongs to the housing 10. In addition, the bellows 5 are shown almost completely, except for a corner section at the corner between the two sides shown in the foreground of the figure. The missing corner section gives an insight in the inner volume of the bellows 5 where the scissor lift is located.

The bellows 5 comprise air inlet holes 52 at their top end which is located at the underside of the plate member 4. The air inlet holes 52 are located under a projection of the plate member 4 projecting beyond the bellows 5 in horizontal (lateral) direction. When the movable part is lifted, the inner volume inside the bellows 5 is expanded (inflated) and air is sucked into the inner volume through the air inlet holes 52.

In addition, the bellows 5 comprise air outlet holes 51 located at their bottom end. When the movable part is lowered, the inner volume inside the bellows 5 is deflated and air blast out of the inner volume through the air inlet holes 52. The two air outlet holes 51 shown in FIG. 7 are located nearby and oriented towards the cooling device 31a. Therefore, air is blown onto the cooling device 31a and it is cleaned from foreign matters.

FIG. 7 also shows a specific embodiment of a drain hole arrangement. The drain holes 35 shown are located in the sidewall of the housing 10. Preferably, there is a canal from the recess 9 connecting the drain holes 35 shown with the interior of the recess 9. In this manner, the drainage capacity is increased. Additional drain holes can be located in the side walls of the recess 9.

The invention claimed is:

1. An inductive power transfer pad for inductive power transfer to a vehicle, comprising a stationary part and a movable part, wherein the movable part comprises a primary winding structure for generating a magnetic or electromagnetic field while an electric current flows through windings of the primary winding structure, wherein the inductive power transfer pad comprises at least one actuator for actuating motion of the movable part, wherein the movable part is movable at least into a first direction by the at least one actuator so as to move between a retracted state and an extended state,
   wherein the inductive power transfer pad comprises a cleaning device integrated in the inductive power transfer pad and adapted to remove foreign matters from a space between the stationary part and the movable part;
   wherein the cleaning device comprises bellows having an expandable air volume with at least one air outlet adapted to direct an air blast to at least a part of the space between the stationary part and the movable part, wherein the expandable air volume is inflated while the movable part moves from the retracted state into the extended state and is deflated while the movable part moves from the extended state into the retracted state.

2. The inductive power transfer pad of claim 1, wherein the cleaning device is automatically operated to remove the foreign matters from the space between the stationary part and the movable part while the movable part moves from the extended state into the retracted state.

3. The inductive power transfer pad of claim 2, wherein the cleaning device comprises a cleaning element attached to the movable part or to the actuator and arranged to wipe off the foreign matters from a surface of the stationary part and/or of the actuator.

4. The inductive power transfer pad of claim 3, further comprising a cooling device in the space between the stationary part and the movable part, wherein the cleaning device is adapted to remove foreign matters from the cooling device.

5. The inductive power transfer pad of claim 1, wherein the expandable air volume fills an area between the movable part and the stationary part.

6. The inductive power transfer pad of claim 5, wherein the expandable air volume has an air inlet which is positioned closer to the movable part than to the stationary part.

7. A method of operating an inductive power transfer pad for inductive power transfer to a vehicle, comprising a stationary part and a movable part, wherein the movable part comprises a primary winding structure which is operated to generate a magnetic or electromagnetic field by conducting an electric current through windings of the primary winding structure, wherein an actuator of the inductive power transfer pad actuates motion of the movable part, so that the movable part is moved at least into a first direction and so that the movable part is moved between a retracted state and an extended state, the method comprising:
    removing, by a cleaning device integrated in the inductive power transfer pad, foreign matters from a space between the stationary part and the movable part;
    directing air, by the cleaning device using bellows having an expandable air volume with at least one air outlet adapted to direct an air blast to at least a part of the space between the stationary part and the movable part;
    inflating the expandable air volume while the movable part moves from the retracted state into the extended state; and
    deflating the expandable air volume while the movable part moves from the extended state into the retracted state.

8. The method of claim 7, wherein the method further comprising:
    removing automatically, by the cleaning device, foreign matters from the space between the stationary part and the movable part while the movable part moves from the extended state into the retracted state.

9. The method of claim 8, the method further comprising:
    wiping off, by the cleaning device using a cleaning element attached to the movable part or to the actuator, the foreign matters from a surface of the stationary part and/or of the actuator.

10. The method of claim 7, the method further comprising:
    filling, by the expandable air volume, an area between the movable part and the stationary part.

11. The method of claim 10, the method further comprising:
    sucking air into the expandable air volume via an air inlet which is positioned closer to the movable part than to the stationary part.

12. The method of claim 7, the method further comprising removing, by the cleaning device, foreign matters from a cooling device in the space between the stationary part and the movable part.

* * * * *